United States Patent [19]
Lerner

[11] 3,806,965
[45] Apr. 30, 1974

[54] LIQUID DISPENSING AND METERING DEVICE WHICH ALSO FORMS A CLOSURE FOR THE CONTAINER

[75] Inventor: Nathan B. Lerner, Chicago, Ill.

[73] Assignee: W. Braun Company, Chicago, Ill.

[22] Filed: Oct. 18, 1971

[21] Appl. No.: 190,114

[52] U.S. Cl. .................................................. 4/227
[51] Int. Cl. ............................................... E03d 9/03
[58] Field of Search ........... 141/156, 157, 174, 195, 141/198, 199, 206, 212, 213, 216, 220, 364, 363, 375; 4/224, 225, 227, 228; 134/100; 220/27; 222/107, 394, 541

[56] References Cited
UNITED STATES PATENTS

| | | |
|---|---|---|
| 3,162,327 | 12/1964 | Bennett............................ 222/541 X |
| 3,203,603 | 8/1965 | Benson ............................ 222/541 X |
| 3,073,488 | 1/1963 | Komter...................................4/227 |
| 2,839,763 | 6/1958 | Newsom ................................. 4/227 |
| 1,987,689 | 1/1935 | Lewis..................................... 4/227 |
| 2,722,394 | 10/1955 | Titmas.................................. 4/227 |

FOREIGN PATENTS OR APPLICATIONS

| | | |
|---|---|---|
| 11,169 | 0/1896 | Great Britain......................... 4/227 |
| 526,597 | 3/1954 | Belgium................................. 4/227 |

Primary Examiner—Houston S. Bell, Jr.
Assistant Examiner—Frederick R. Schmidt
Attorney, Agent, or Firm—Max R. Kraus

[57] ABSTRACT

A liquid dispensing and metering device for automatically and periodically dispensing a predetermined quantity of liquid into a flush tank or the like, which device comprises an integrally formed member which may be readily secured to the neck or discharge opening of a container to form a closure for the container and which is provided with a cup-shaped member extending exteriorly of the neck of the container, with the wall of the cup-shaped member having means which may be snipped or cut to provide an opening through which the liquid in the container is dispensed in measured amounts.

1 Claim, 5 Drawing Figures

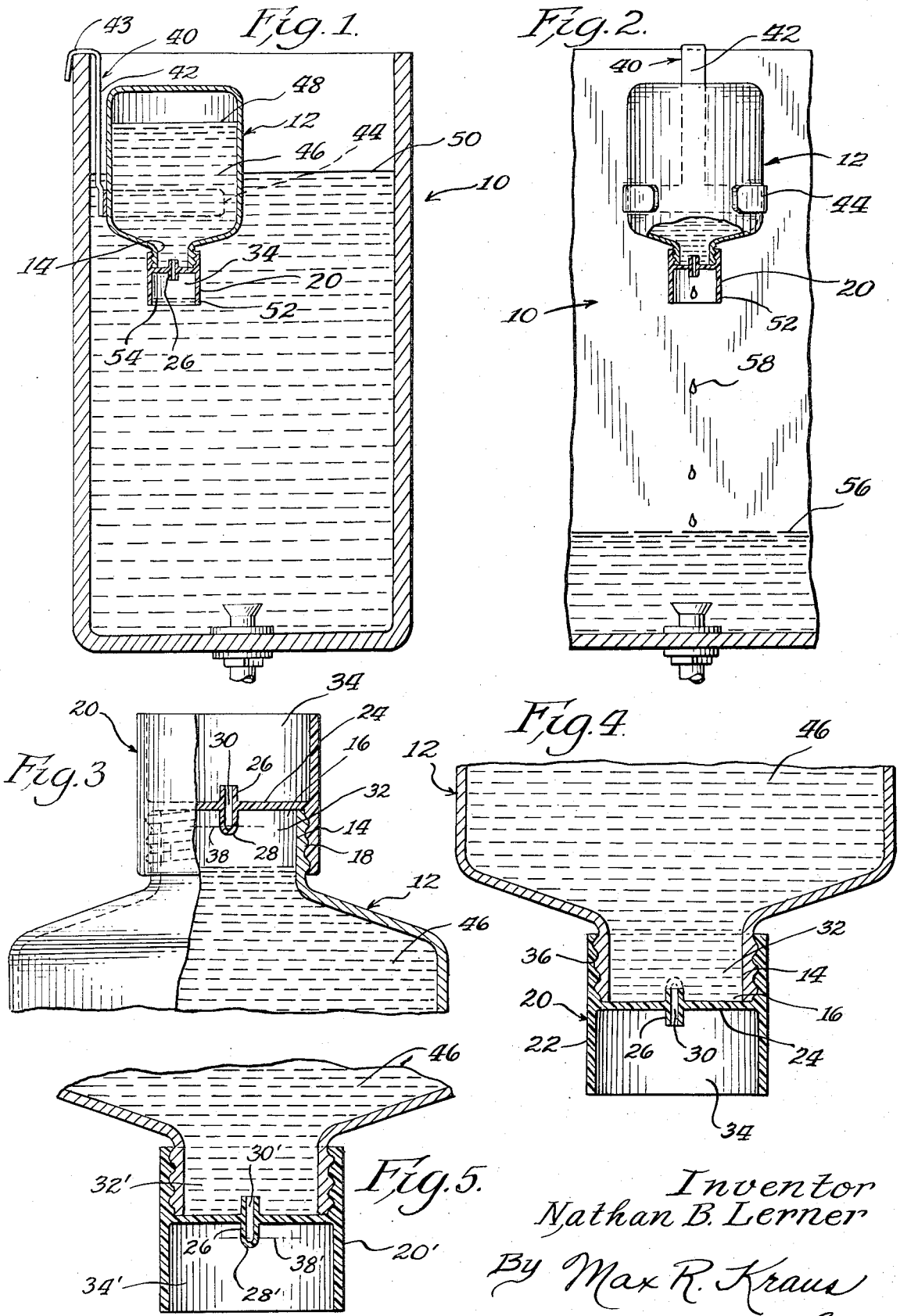

LIQUID DISPENSING AND METERING DEVICE WHICH ALSO FORMS A CLOSURE FOR THE CONTAINER

BRIEF SUMMARY OF THE INVENTION

An object of this invention is to provide a liquid dispensing and metering device for use in connection with a flush tank for a toilet, in which a measured amount of liquid, such as a liquid detergent, disinfectant, or the like, is automatically discharged into the water in the flush tank upon the dropping of the water level within the tank and before the subsequent rise of the water is completed, and wherein the device is an integrally formed unit which is secured to the outlet end or neck of the container to form a closure therefor, and which unit may be readily converted to a dispensing and metering device by snipping or cutting off a part to thereby provide the liquid dispensing and metering function of the device.

The invention herein may be economically produced in that it is a single integrally formed unit with no moving parts and it combines the function of a closure cap for the container so that the container may be transported and displayed with the device thereon without the possibility of the contents therein being discharged from the container accidentally, and said device may be used as a dispensing and metering device in a flush tank by merely snipping or cutting off the closed end of the tubular portion to provide a communicating opening through which the material in the container is discharged in a measured amount.

BRIEF DESCRIPTION OF THE DRAWINGS

In the drawings:

FIG. 1 is a sectional view showing the invention supported in a conventional toilet flush tank with the level of the liquid in the tank prior to flushing.

FIG. 2 is a view showing the level of the liquid in the tank below the device, as when the toilet is flushed, so that a measured amount of the liquid in the bottle or container is discharged into the flush tank.

FIG. 3 is an enlarged sectional view of the device forming a closure or cap for the container.

FIG. 4 is an enlarged sectional view of the device shown in FIG. 3, with the closed end of the tubular portion snipped off to provide a communicating passageway and with the device functioning as a liquid dispensing and metering device; and FIG. 5 is a sectional view of a modification.

DETAILED DESCRIPTION

The conventional flush tank which includes a conventional type of flush system for a toilet is indicated by the numeral 10 and same is automatically refilled up to the desired water level after each flushing operation, as is well understood. The liquid dispenser, generally indicated at 12, comprises a container, such as a bottle, can, or the like, of the desired capacity, which bottle or can is preferably provided with a reduced neck 14 which provides an outlet opening, mouth or discharge end 16 for the bottle or can. The neck 14 is externally threaded as at 18. In all respects the bottle or container 12 can be of conventional construction.

The device of this invention which functions as a liquid metering and dispensing device also serves as a closure for the container. It is an integrally formed member preferably molded of a plastic material such as polyethylene or the like. It is generally indicated at 20 and has an annular side wall 22 and an intermediate separating wall 24. The intermediate separating wall 24 is formed with a central tubular member 26 with the bottom end thereof closed as indicated at 28. As thus formed, the intermediate separating wall 24 has a central passageway or opening 30 which, as described, is closed at its inner end. The separating wall 24 divides the unit into two chambers 32 and 34. The inner chamber is indicated by the numeral 32 and the outer chamber is indicated by the numeral 34. The interior of the annular side wall of the inner chamber 32 is internally threaded as at 36 for threaded engagement with the threads 18 on the neck of the container. The outer chamber 34 has a larger volumetric capacity than the inner chamber 32 as the intermediate separating wall 24 is closer to the inner end of the device.

The device 20 is secured to the neck of the container, as shown in FIG. 3, and provides a sealed closure for the outlet end of the container and in this position the bottle and the device may be packaged, transported and displayed with safety. When it is desired that the device be used for its ultimate purpose, namely, as a liquid dispensing and metering device, the device 20 is unscrewed from the neck of the bottle and the closed inner end 28 of the tubular member 30 is snipped or cut off at the bend, as indicated by the dotted lines 38 in FIG. 3, so that a passageway or opening 30 is provided between the inner and outer chambers 32 and 34. The device 20 is then reapplied to the neck of the container and is then ready for use in connection with a conventional flush tank, as shown in the drawings.

The container 12 with the device 20 thereon is supported in an inverted position, as shown in FIGS. 1 and 2, inside the flush tank 10 in any desired manner, however, for the purpose of illustration, the bottle or container is suspended by a hanger bracket 40 which has an elongated member 43 provided at the upper end with a hook 43 to engage over the upper edge of the side wall of the water tank 10. The opposite or lower end extremity of the member carries the laterally disposed and oppositely directed arms 44 between which the bottle or container is tightly held. As shown, the bottle or container containing the liquid to be dispensed is supported in the tank 10 in an inverted position. In this position the device 20 is inverted from that shown in FIG. 3 and assumes the inverted position shown in FIGS. 1, 2 and 4. The container 12 is not completely filled with liquid to be dispensed and, as indicated in FIG. 1, when in inverted position the top of the liquid 46 to be dispensed from the container 12 would be up to the approximate level indicated by the line 48 in FIG. 1.

When the container is inverted, the liquid 46 in the container 12 is normally held against discharge by a partial vacuum within the container above the level 48 and there will be no discharge beyond the first few drops. When the flush tank fills with water above the mouth of the device, air is entrapped and compressed in the outer chamber 34 of the device, increasing as the level 50 rises relative to the container, and a portion of this air is forced into the container 12 through the opening 30 and tubular member 26, and the air will pass up through the liquid 46 within the container and above the liquid level 48 in the container and thereby reduce the partial vacuum above the liquid in the container and create a pressure against the liquid to effect a discharge automatically through the opening 30 and tubular member 26 when the water level within the tank lowers below the mouth of the device. Thus, when the water in the flush tank drops below the mouth of the device, as shown in FIG. 2, as when the toilet is flushed, a predetermined amount of the liquid 46 will be automatically discharged from the bottle or container 12 into the flush tank.

The level of the water in the flush tank when same is normally filled is as indicated by the numeral 50 in FIG. 1, thus, the outlet end or mouth 52 of the outer chamber 34 of the device is submerged in the water within the tank, as shown in FIG. 1. However, the outer chamber 34 is substantially free of the tank water, except for a small amount of water which enters the mouth of chamber 34 to approximately the level indicated by the numeral 54. This is very important in order to prevent any of the tank water from getting into the interior of the bottle or container 12 and diluting the contents thereof. In flushing, the water within the toilet tnak drops below the mouth or outlet end 52 of the device 20 to approximately the level indicated at 56, as shown in FIG. 2, and the liquid 46 in the container 12 will be automatically discharged in the form of a stream of liquid or drops 58, the amount of which is determined in the main by the diameter of the opening 30. The amount of liquid discharged from the container or bottle at each period of discharge is dependent on the amount of air forced into the container or bottle above the liquid therein and the amount is determined by the volumetric capacity of the outer chamber 34 of the device. Since the quantity of liquid released at each period of discharge is approximated to the volume of air which is trapped in the outer chamber 34 of the device and forced into the container 12, and this volume of air is proportional to the size of the outer chamber 34, it is possible to control the amount of liquid to be periodically discharged by forming an outer chamber of a size to give the desired volumetric capacity and an opening 30 proportionate thereto acting in relation to the correct submerging depth.

The liquid within the container or bottle is of a sanitizing or detergent character and serves to remove film or the like which normally forms on the interior of the toilet bowl and it thereby maintains the toilet bowl in a sanitary condition. The device thus serves the dual function of providing a closure for the container and providing a liquid dispensing and metering device, all provided by a simple integrally formed unit. Since there are no moving parts in connection with the device, the cost of fabricating the unit is very inexpensive. It also eliminates the use of a conventional closure cap as the invention herein serves that additional function.

FIG. 5 EMBODIMENT

FIG. 5 shows a modification in which the only difference between it and the previously described structure is that the tubular portion 26' which extends into the outer chamber 34' is provided with a closed bend 28' with the opposite end of the tubular portion extending into the inner chamber 32' being open. In this modified construction it is possible to snip or cut off the bend 28' as at 38' and provide the communicating passageway 30' without removing the device 20' from the bottle. The operation of the device is the same as that previously described.

What is claimed is:

1. A device for forming a leak-proof sealed closure for a container, which also functions to automatically and periodically dispense a predetermined quantity of liquid from the container into a flush tank or the like, with said container supported in the flush tank with the mouth or discharge end of the container facing downwardly, said device including an integrally formed member having an annular side wall and a single intermediate cross separating wall integrally formed with said annular side wall which forms an outer chamber and an inner chamber, said inner chamber having means for securing said device to the container so that said device serves as a closure for the mouth of said container, said single intermediate wall having a short tubular axially positioned member integrally formed therewith whose opposite ends extend into said inner and outer chambers with the opposite ends of said tubular member closely adjacent the single intermediate wall and wholly within said outer and inner chambers, said axially positioned tubular member being initially closed at one end to form a closed passageway so that said device forms a leak-proof sealed closure when said tubular member is initially closed and so constructed that said passageway may be manually opened by opening the closed end of said tubular member so that the outer chamber is in communication with the liquid in the container and the end of the tubular member within the inner chamber is free from any obstruction above said end of said tubular member to directly and axially receive the liquid from the container, and in which the liquid is dispensed and discharged into the flush tank after each flushing.

* * * * *